United States Patent Office 3,358,606
Patented Dec. 19, 1967

3,358,606
MICROPUMPS FOR DELIVERING ACCURATELY MEASURED AND ADJUSTABLE QUANTITIES OF LIQUID
Bernard Holliger, 11 Rue Charles Allemand, Audincourt, Doubs, France
Filed Apr. 13, 1967, Ser. No. 630,653
Claims priority, application France, Apr. 21, 1966, 58,490
2 Claims. (Cl. 103—37)

ABSTRACT OF THE DISCLOSURE

A micropump for delivering accurately measured quantities of liquid upon each pump impulse, comprising a cylinder having an extension of greater diameter, a piston slidably mounted in said cylinder and adapted upon each actuation to engage a valve member normally urged by a spring against a seat to close the bottom of said cylinder, said cylinder being formed in a block adapted to be adjusted in its axial direction by means of a micrometric screw for altering at will the quantity of liquid delivered by the pump upon each pump impulse without modifying the piston stroke.

Field of the invention

The present invention is concerned with a micropump of the adjustable output type, adapted upon each impulse to deliver or inject an accurately measured quantity of liquid.

The essential features of the micropump according to this invention are its great constructional simplicity, its sturdiness, the precision of the quantities delivered thereby, its leakproof operation even under relatively high pressures, and the possibility of modifying at will the quantity of liquid delivered by each pump impulse during the pump operation. This pump is adapted more particularly to be controlled by a volumetric counter measuring the output of a first liquid for injecting by means of the micropump predetermined quantities of a second liquid into said first liquid. Thus, for example, the quantities delivered by the micropump according to this invention may vary from 0.3 to 7 per 10,000 with delivery pressures ranging from 15 to 7 kg. per square centimeter (210 to 100 p.s.i.).

Summary of the invention

To this end the metering micropump according to this invention, which is of the type wherein a piston is adapted to draw a liquid into a cylinder and to force this liquid through a port provided at the bottom of the cylinder, is characterized in that the bottom of said cylinder is closed by a valve member mounted in an extension of greater diameter of said cylinder and adapted to be moved by the piston into said extension at the end of the piston stroke so as to unseat the valve member, the predetermined quantities of liquid to be delivered by the pump being adjustable not by altering the position or the stroke of the piston, but by causing the cylinder to slide in a direction parallel to its axis in order to reduce or increase the length of the useful piston stroke in said cylinder and therefore the pump output.

In order to afford a clearer understanding of this invention and of the manner in which the same may be carried out in practice, reference will now be made to the accompanying drawing illustrating diagrammatically by way of example a typical form of embodiment of the invention.

Description of the preferred embodiments

Figure 1:
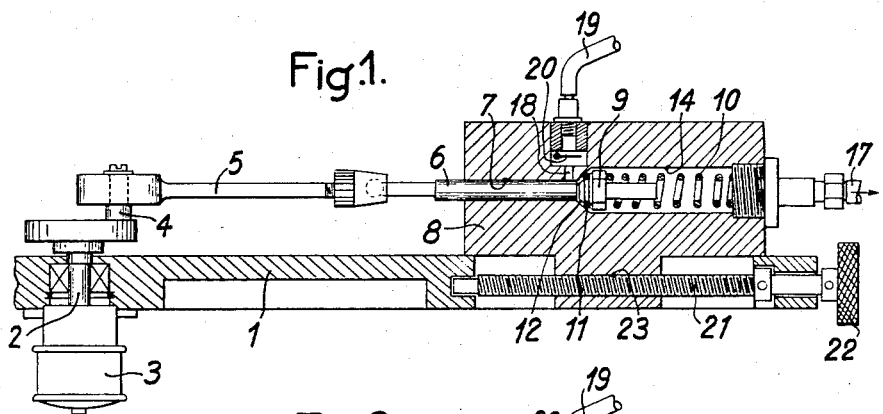
FIGURES 1 and 2 are longitudinal sectional views of the micropump according to this invention, showing two different positions of the cylinder.

Mounted on a bed, frame structure or like support 1 is a crankshaft 2 rotatably driven by a motor 3 and having a crankpin 4 adapted, through the medium of a connecting-rod 5, to reciprocate a piston slidably mounted in a cylinder 7 bored in a cylinder block 8; the bottom of this cylinder 7 is normally closed by a valve member 9 urged against its seat by a coil compression spring 10; this valve member 9 carries on its tapered front face a sealing packing or O ring 11 engaging the tapered valve seat 12; the lateral wall of valve member 9 is cylindrical so as to be properly guided by the bore 14 of greater diameter constituting the extension of cylinder 7; the fluid forced by the piston 6 can flow along the valve 9 due to the provision of flat faces 16 thereon, the metered liquid being subsequently forced through an outlet pipe 17.

An inlet port 18 for the liquid to be pumped opens into cylinder 7 near the end which is normally closed by the valve member 9 and is connected with a feed line 19. A check valve 20 is provided to permit flow of this liquid only in a direction toward the cylinder 7.

A micrometric screw 21 is rotatably mounted in the support 1 but held against axial movement. The screw 21 is rotatable by a control knob 22 and engages a corresponding tapped hole 23 formed in a laterally projecting portion of the cylindrical block 8 so that the block can be moved axially in either direction by rotation of the screw 21.

Figure 2:
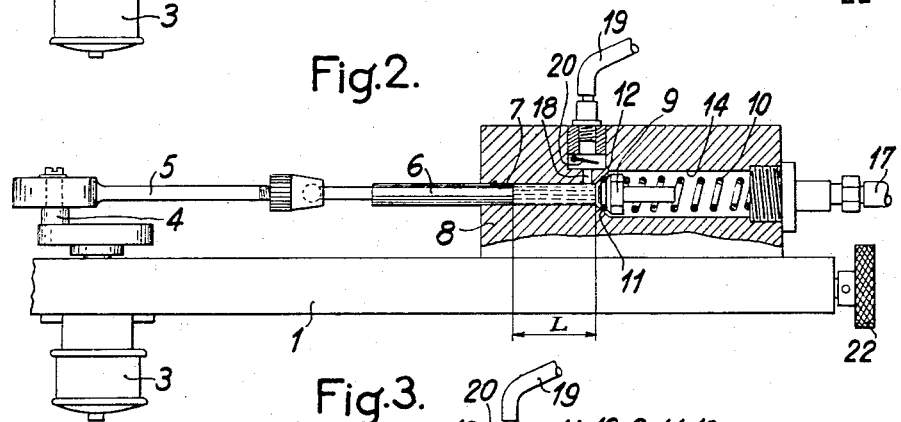

The pump operates as follows:

Starting with the piston 6 in the position shown in FIG. 1 with its end contacting the end of valve 9 having its packing ring 11 seated on the valve seat 12, rotation of the crank shaft 2 by the motor 3 acts through the crank pin 4 and the connecting rod 5 to move the piston backwards, i.e., toward the left as seen in the drawings. As the piston moves by a length L to the opposite end of its stroke as shown in FIG. 2, the volume thus freed within the cylinder 7 is filled with liquid supplied by the feed line 19 through inlet 18 and check valve 20. As rotation of the crank shaft continues, the piston moves in the opposite direction, i.e., toward the right as seen in the drawings, and forces the metered liquid contained in said volume through the valve 9 and into the outlet or delivery line 17.

Under these conditions the maximum metered output is obtained.

Figure 3:
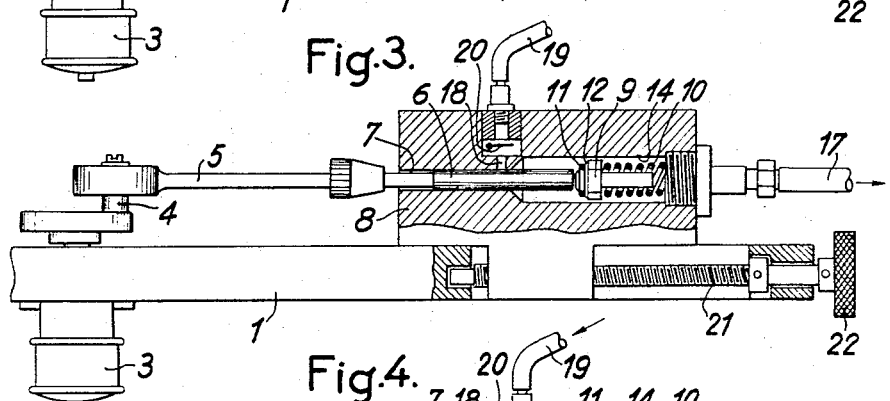
FIGURES 3 and 4 are similar views with the cylinder set in a different position to produce a different pump output.
Figure 4:
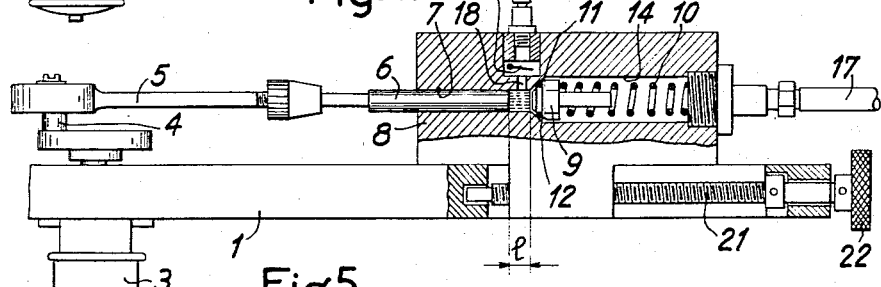
Figure 5:
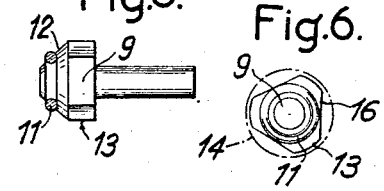
FIGURES 5 and 6 are detail views respectively in side and front elevation, showing on a larger scale the valve member closing the bottom of the cylinder.
Figure 6:
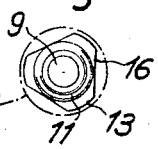

When it is desired to reduce the metered output, the micrometric screw 21 is turned by means of the knurled control knob 22 and the cylinder block 8 will thus slide towards the piston, for example to the position shown in FIGURES 3 and 4.

In this position the initial portion of the piston stroke has no influence on the supply of liquid from the feed line 19 since the inlet port 18 is closed by the piston 6; it is only when the front end of piston 6 penetrates into the cylinder 7 and the valve 9 is closed, its packing 11 engaging the valve seat 12, that the piston begins its operative stroke which, in the case contemplated herein, has a length $l$, the quantity of liquid drawn into the cylinder corresponding to the volume represented by this length $l$ of cylinder 7 by the cross-sectional area of the cylinder; this metered quantity of liquid is forced through the outlet into the delivery pipe 17 as in the preceding case.

Of course, the form of embodiment of the invention which is shown and described herein should not be construed as limiting the present invention since many modifications may be brought thereto without departing from the spirit and scope thereof as set forth in the appended claims.

What I claim is:

1. A micropump for delivering accurately metered quantities of liquid upon each pump impulse, which comprises a cylinder having a lateral valved inlet port for feeding thereto the liquid to be pumped and metered and an outlet port in its bottom, a piston adapted to slide with the minimum play in said cylinder and reciprocated to perform an invariable stroke therein, an extension of greater diameter of said cylinder, a valve member disposed in said extension and adapted to close said bottom port of said cylinder, spring means in said cylinder extension for constantly urging said valve member to its bottom port closing position after said piston, having completed its delivery stroke, has pushed said valve member into said extension, and means for causing said cylinder and said cylinder extension to slide in a direction parallel to their common axis for decreasing or increasing the length of the useful stroke portion of said piston in said cylinder, and therefore the pump output.

2. A micropump as set forth in claim 1, wherein said means for causing said cylinder and cylinder extension to slide in their axial direction comprise a micrometric screw.

References Cited
UNITED STATES PATENTS

| | | | |
|---|---|---|---|
| 2,268,000 | 12/1941 | Treer | 103—37 |
| 2,633,082 | 3/1953 | McFarland | 103—37 |
| 3,229,640 | 1/1966 | Williams | 103—37 |
| 3,312,169 | 4/1967 | Schultz | 103—37 |

LAURENCE V. EFNER, *Primary Examiner.*